Figure 4:
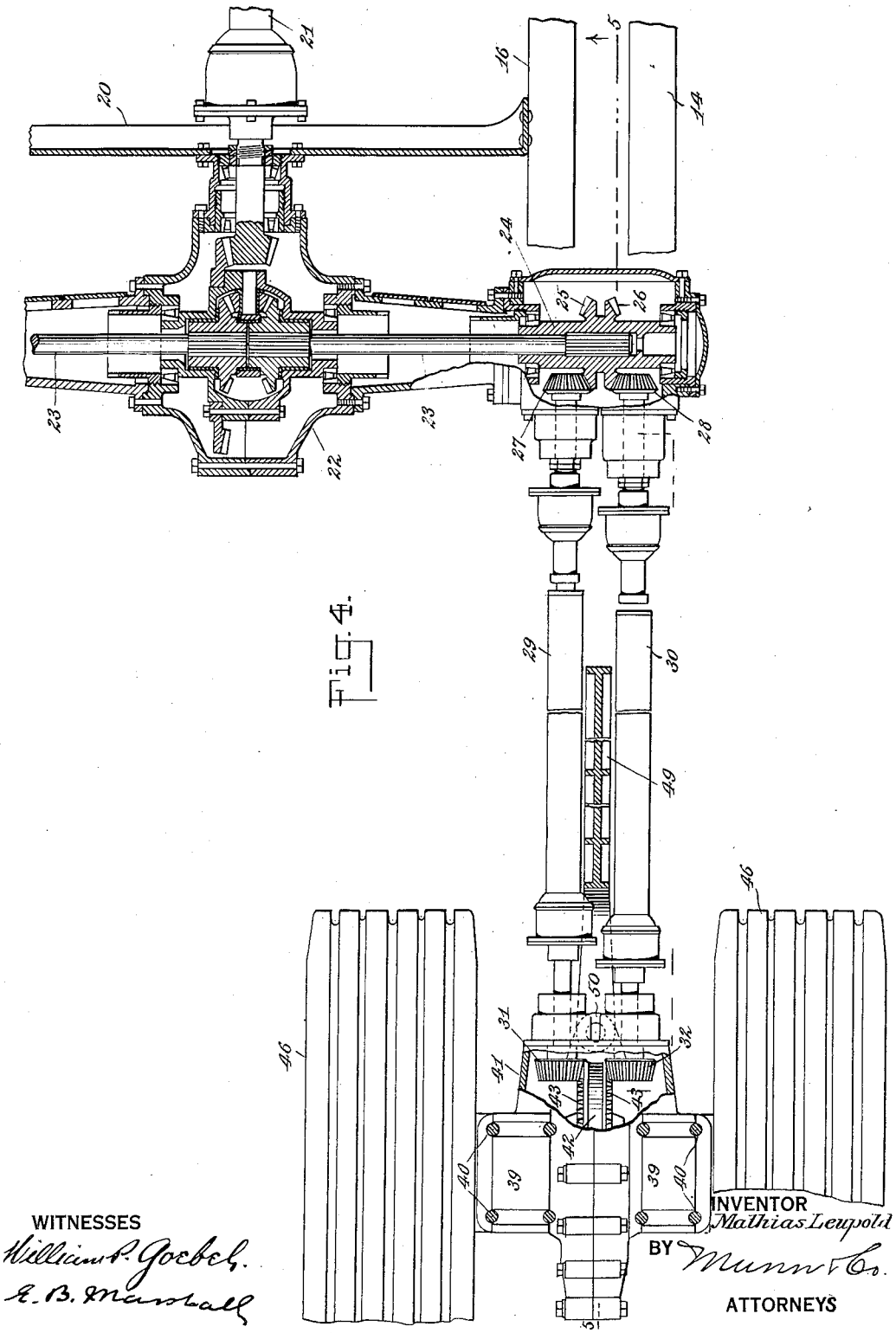

June 13, 1933.    M. LEUPOLD    1,914,266
SIX-WHEEL AUTOMOTIVE VEHICLE AND DRIVING MEANS THEREFOR
Filed April 16, 1930    5 Sheets-Sheet 1
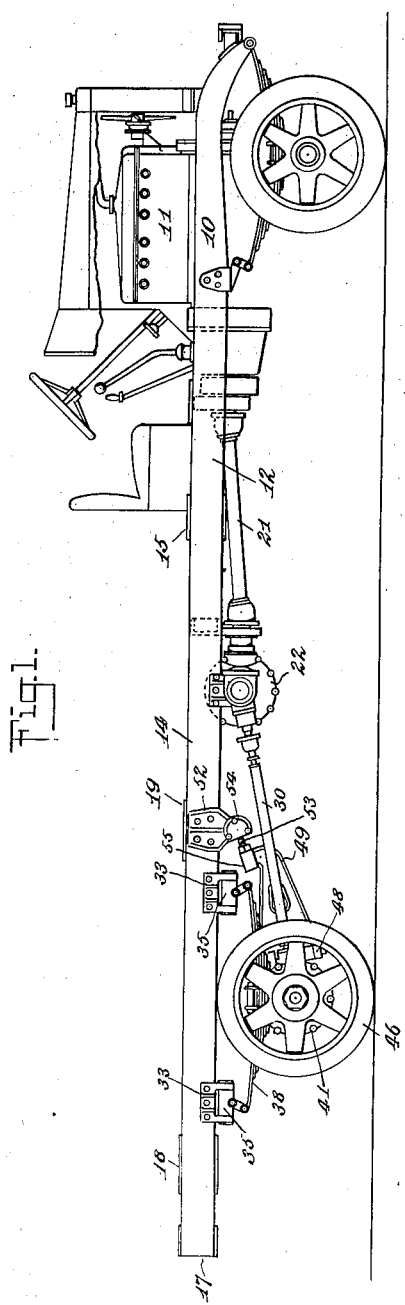
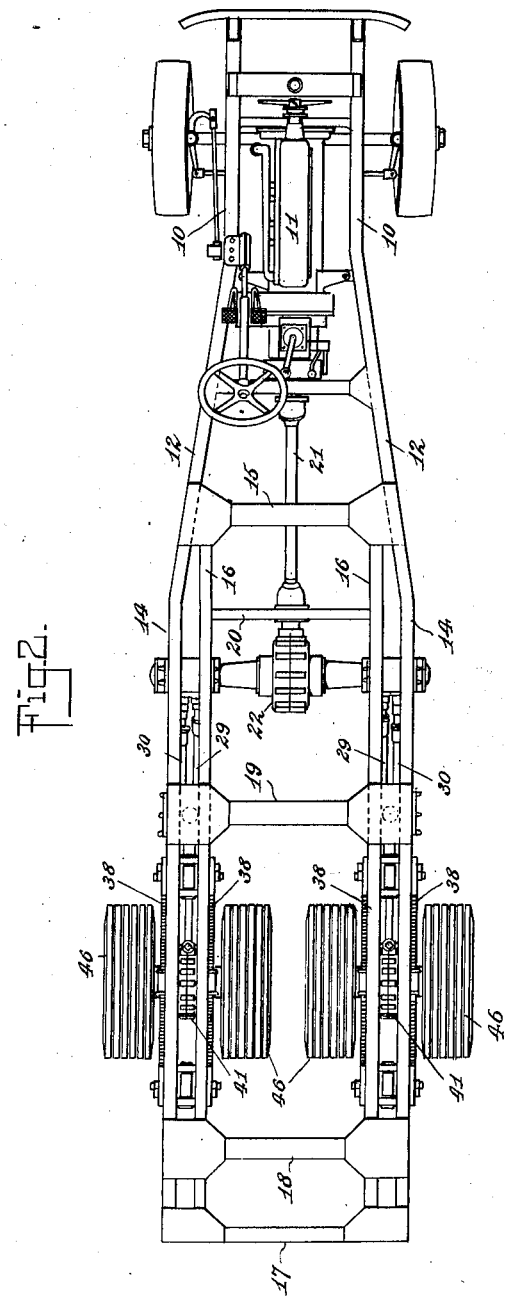
WITNESSES
INVENTOR
Mathias Leupold
BY
ATTORNEYS

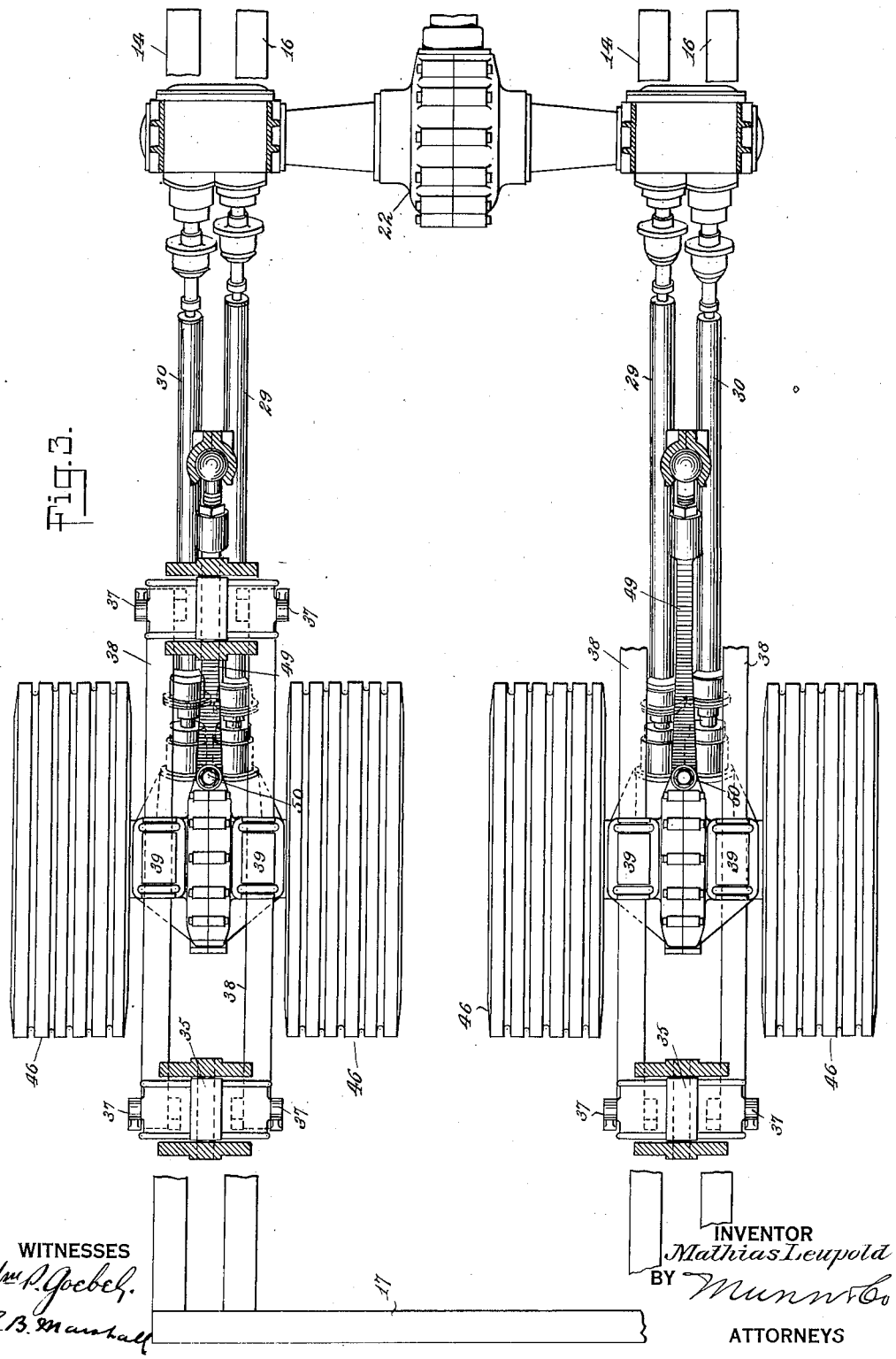

June 13, 1933. M. LEUPOLD 1,914,266
SIX-WHEEL AUTOMOTIVE VEHICLE AND DRIVING MEANS THEREFOR
Filed April 16, 1930 5 Sheets-Sheet 3

WITNESSES

INVENTOR
Mathias Leupold
BY
ATTORNEYS

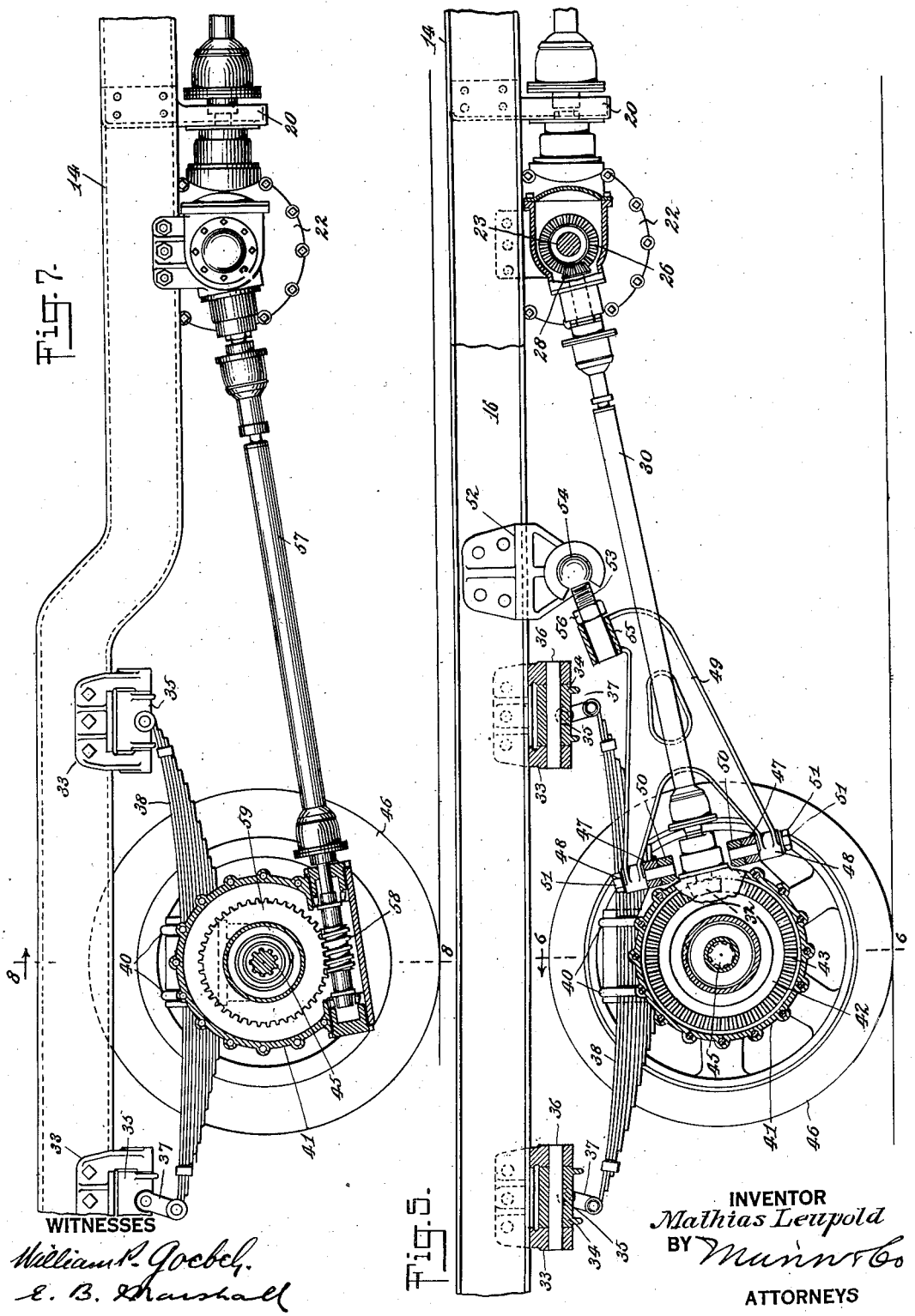

June 13, 1933.  M. LEUPOLD  1,914,266
SIX-WHEEL AUTOMOTIVE VEHICLE AND DRIVING MEANS THEREFOR
Filed April 16, 1930   5 Sheets-Sheet 5
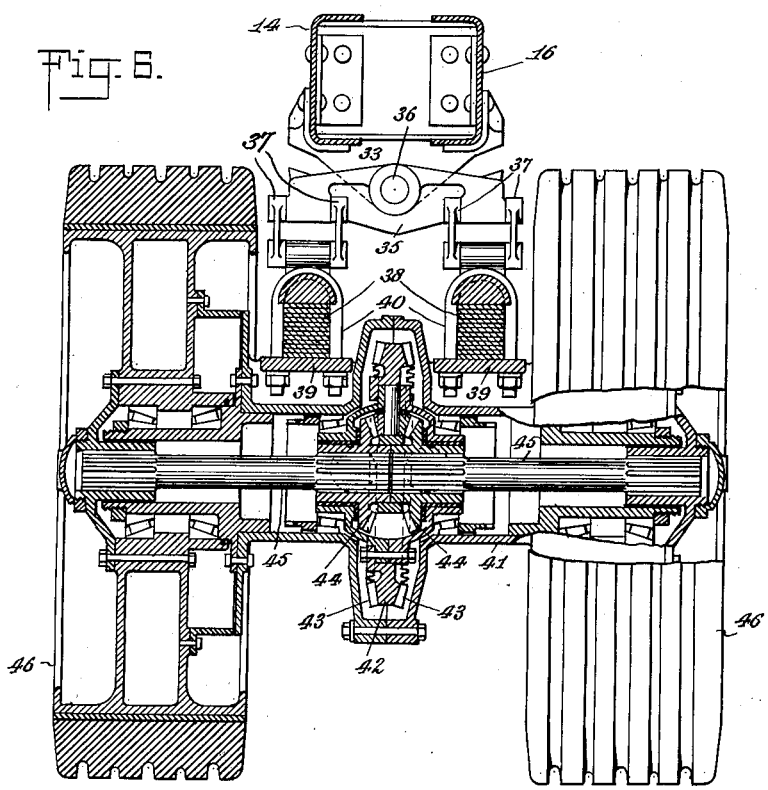
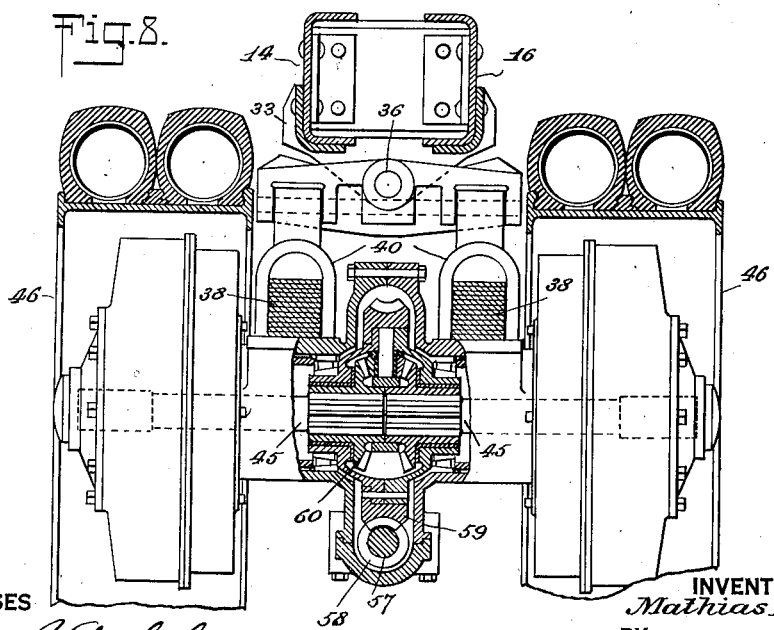
INVENTOR
Mathias Leupold
BY Munn & Co.
ATTORNEYS Patented June 13, 1933

1,914,266

UNITED STATES PATENT OFFICE

MATHIAS LEUPOLD, OF NEW YORK, N. Y.

SIX WHEEL AUTOMOTIVE VEHICLE AND DRIVING MEANS THEREFOR

Application filed April 16, 1930. Serial No. 444,813.

My invention has for its object to provide an automotive vehicle of the class described having relatively to the size and weight of the automotive vehicle great carrying capacity and unusually powerful driving means.

Another object of the invention is to provide an automotive vehicle in which flexibility is increased and vibration is reduced, thereby lessening the wear and tear of the automotive vehicle, including the tires.

Another object of the invention is to provide an automotive vehicle in which excessive axle weights are avoided.

Another object of the invention is to provide an automotive vehicle having two pairs of driving wheels mounted to make tracks which will be disposed at the sides of the tracks made by the wheels at the other end of the automotive vehicle.

Still another object of the invention is to pivot each pair of driving wheels at a side of the automotive vehicle and to provide separate driving means for each pair of driving wheels.

Still another object of the invention is to provide an automotive vehicle with an axle which is mounted to pivot on vertical and horizontal axes relatively to the chassis frame.

Still another object of the invention is to provide each pair of driving wheels with driving means, springs and pivoted mountings, all disposed between the said driving wheels.

Still another object of the invention is to provide a simple means for connecting the rear axle housing with the frame of the chassis which makes it possible to quickly remove the rear axle housing assembly for repairs.

Another object of the invention is to provide an automotive vehicle with a double chassis frame to strengthen the parts with the least possible increase in weight.

Additional objects of the invention will appear in the following specification in which the preferred form of my invention is described.

In the drawings similar reference characters refer to similar parts in all the views of which Figure 1 is a side elevation illustrating how my invention is applied to an automotive vehicle, Fig. 2 is a plan view of Fig. 1, Fig. 3 is an enlarged sectional plan view illustrating the rear of an automotive vehicle to which my invention is applied, Fig. 4 is an enlarged sectional view illustrating the means for operating the driving wheels, Fig. 5 is a sectional view on the line 5—5 of Fig. 4, Fig. 6 is an enlarged sectional view on the line 6—6, Fig. 5, Fig. 7 is a view similar to Fig. 5, but showing a modified form of the invention, and Fig. 8 is a sectional view on the line 8—8, of Fig. 7.

By referring to Fig. 2 of the drawings it will be seen that the chassis frame has sides 10 which are parallel with the engine 11 when the sides diverge at 12 for a distance, when they again extend rearwardly at 14 parallel with each other. At the diverging portions 12 of the sides of the frame of the chassis there is a transverse frame member 15 from which extend two parallel auxiliary frame members 16 which are spaced from the parallel portions 14 of the chassis frame. The portions 14 of the chassis frame are connected by a transverse member 17 and there are additional transverse members 18 and 19 which extend from the portions 14 of the sides of the frame and which are secured to the said portions 14 and also to the members 16. In this way a light and rigid frame is secured.

Connecting the auxiliary frame members 16 there is a frame member 20 which supports a bearing for the main propeller shaft 21, this main propeller shaft 21 leading to a differential 22 from each side of which extends a shaft 23. At the ends of the shafts 23 and mounted to rotate therewith there are hubs 24, to each of which preferably there are secured two gears 25 and 26, the gear 25 meshing with a gear 27 and the gear 26 meshing with a gear 28. To these gears 27 and 28 there are secured shafts 29 and 30 which have at their rear ends gears 31 and 32, all of which is best illustrated in Fig. 4 of the drawings.

Disposed at each side of the chassis frame there are two cradle brackets 33, each of the cradle brackets 33 having an opening 34 extending through its bottom, and in these openings 34 there are disposed cradles 35, the cradle brackets 33 and the cradles 35 having apertures through which pins 36 are disposed. These pins extend longitudinally of the chassis frame and it will, therefore, be seen that the cradles 35 may rock on an axis longitudinally of the automotive vehicle. Extending downwardly from each of the cradles 35 there are two pivoted link members 37, as best illustrated in Fig. 6 of the drawings.

Each of the link members 37 has a pair of links and one of these link members 37 with its pair of links is pivoted to the forward end of each leaf spring 38 and another link member with its pair of links is pivoted to the rear of each leaf spring 38, there being four of these leaf springs 38, two spaced apart and disposed at each side of the automotive vehicle with the cradles 35 pivoted between the said link members.

It will, therefore, be understood that the ends of one of the leaf springs may be moved upwardly or downwardly relatively to the ends of the other leaf spring at the same side of the automotive vehicle, which insures great flexibility. It will be understood that not only is this true, but that the cradles 35 carrying the ends of the two leaf springs 38 at one side of the automotive vehicle may be rocked in one direction, while the cradles at either side of the automotive vehicle carrying a similar pair of leaf springs may be rocked in another direction.

The two leaf springs 38 at one side of the automotive vehicle are secured to seats 39 by means of U-shaped locking bolts 40 in a manner readily understood and as shown in Fig. 6 of the drawings. The seats 39 are secured to rear axle housings 41. In each of the rear axle housings 41 and mounted to rotate there is a gear wheel 42 having two sets of gear teeth 43 which are on opposite faces of the gear 42 and which mesh with the gears 31 and 32, as best illustrated in Figs. 1 and 4 of the drawings. The gear wheel 42 forms a part of a differential 44 which serves to rotate axles 45 on which driving wheels 46 are mounted.

It will, therefore, be understood that not only will it be possible for one of the driving wheels 46 at one side of the automotive vehicle to move upwardly relatively to the other driving wheel 46 at the same side of the automotive vehicle, but it will also, because of the differential 44, be possible for one of the driving wheels 46 to rotate more rapidly than the other driving wheel 46 at the same side of the automotive vehicle, thereby giving great flexibility.

As will best be seen by referring to Fig. 5 of the drawings, the two rear axle housings 41, one at each side of the automotive vehicle, each has two sleeves 47, the sleeves being spaced apart and being in alignment so that the ends 48 of a torque member 49 may be disposed at the outer sides of the sleeves 47 and bolts 50 may be disposed through the openings in the sleeves 47 and through openings in the ends 48 of the torque member 49, which with nuts 51 serve to hold the ends 48 of the torque member 49 at the sleeves 47 with the torque member 49 pivoted relatively to the rear axle housing. Secured to each side of the chassis frame there is a torque rod bracket 52 which forms with threaded studs 53 universal joints 54, the threaded studs 53 being disposed in sleeves 55 at the forward ends of the torque members 49, nuts 56 meshing with the threads on the threaded studs 53 to limit the movement of the studs 53 in the stud sleeves 55.

It will be seen that the torque members 49, together with the leaf springs 38 will serve to hold the rear axle housings 41 with the axles 45 and the driving wheels 46 yieldingly in alignment, while making it possible for these driving wheels 46 to move slightly when striking obstructions to relieve the shock and consequently increasing the flexibility and preventing unnecessary wear of all the parts of the automotive vehicle.

It will be understood that either of the rear axle housings 41 may be readily removed from the chassis frame by withdrawing the two pins 36, which frees the cradles 35 from the cradle brackets 33 on one side of the chassis frame, and by disengaging the torque member 49 from the threaded stud 53.

The four springs, two for each of the rear axle housings, give great flexibility while supporting a considerable load, and as the driving wheels 46 always have a good grip on the road it will be possible to get the best immediate results from an application of the brakes, which are not shown.

In the modified form of the invention illustrated in Figs. 7 and 8 the construction is substantially the same as the construction illustrated in the other views, except that the one shaft 57 extends rearwardly and is driven by a gear connected with the shaft 23, this shaft 57 having a worm 58 which meshes with a worm wheel 59 forming a part of a differential 60, which corresponds with the differential 44 illustrated in Fig. 6 of the drawings.

It will be seen, however, by again referring to Fig. 7 of the drawings, that the torque member 49 is not employed and the forward ends of the leaf springs 38 are secured directly to the cradles 35 without the use of the link members 37. With this construction the leaf springs 38 serve to hold the rear axle housing 41 yieldingly in position.

It will be seen by referring to Fig. 7 of the drawings that the chassis frame in the modified form of the invention extends upwardly and rearwardly from points in advance of the forward cradle brackets 33. The shafts 29 and 30 are preferably provided with universal joints and keyed telescopic parts so that the said shafts at the rear axle housings may move to permit their rear gears 31 and 32 to keep at all times in mesh with the gear wheels 43. The shafts 57 are also each preferably provided with universal joints and keyed telescopic parts to accomplish the same result with reference to its worm 58 and the worm wheel 59. When a rear axle housing is to be removed from the chassis frame the parts of the shafts 29 and 30 may be separated and when the modified form of the invention is used the parts of the shafts 57 may similarly be separated.

What is claimed is:

1. In an automotive vehicle, a chassis frame, a pair of driving wheels disposed at a side of the chassis frame, a driving means disposed between the driving wheels and being connected therewith, an axle support for the driving wheels, a pair of springs secured to the axle support, a cradle pivoted on a longitudinal axis at a side of the chassis frame, links, each movable relatively to the other and pivoted on transverse axes to one set of ends of the springs, the links extending upwardly from the springs and being pivoted on transverse axes to the cradle, and means securing the other ends of the springs to the chassis frame.

2. In an automotive vehicle, a chassis frame, a pair of driving wheels disposed at a side of the chassis frame, a driving means disposed between the driving wheels and being connected therewith, an axle support for the driving wheels, a pair of springs secured to the axle support, a cradle pivoted on a longitudinal axis at a side of the chassis frame, two links, each movable relatively to the other and pivoted on transverse axes to one set of ends of the springs, the links extending upwardly from the springs and being pivoted on transverse axes to the cradle, means securing the other ends of the springs to the chassis frame, a torque rod pivoted on a vertical axis to the axle support, and a universal joint connecting the torque rod with the chassis frame.

3. In an automotive vehicle, a chassis frame, a pair of driving wheels for the chassis fame, a driving means disposed between the driving wheels and being connected therewith, an axle support for the driving wheels, a pair of springs secured to the axle support, a cradle pivoted on a longitudinal axis to the chassis frame, two links, each movable relatively to the other and pivoted on transverse axes to one set of ends of the springs, the links extending upwardly from the springs and being pivoted on a transverse axis to the cradle, means securing the other ends of the springs to the chassis frame, a torque rod pivoted on a vertical axis to the axle support, and a universal joint secured to the chassis frame and having a stud with a sleeve slidable thereon to which the torque rod is secured.

4. In an automotive vehicle, a chassis frame, a main load-sustaining spring on the frame having lateral swinging movement with respect to the longitudinal axis of the frame, an axle mounting secured to said spring, torque means, means connecting the torque means with said mounting so that the torque means may have lateral swinging movement with respect to said mounting, and a universal joint connecting the torque means with said frame.

5. In an automotive vehicle, a chassis frame, a pair of driving wheels for the frame, driving means disposed between the driving wheels and being operatively connected therewith, an axle support for the driving wheels, a pair of load-sustaining springs secured to said axle support, suspension means connecting the ends of the springs with said frame so that said springs may have lateral swinging movement with respect to the longitudinal axis of the frame, torque means, means connecting the torque means with said mounting so that the torque means may have lateral swinging movement with respect to said mounting, and a universal joint connecting the torque means with said frame.

6. In an automotive vehicle, a chassis frame, a pair of driving wheels for the frame, driving means disposed between the driving wheels and being operatively connected therewith, an axle support for the driving wheels, a pair of load-sustaining springs secured to said axle support, suspension means connecting the ends of the springs with said frame so that said springs may have lateral swinging movement with respect to the longitudinal axis of the frame, and also movement in a direction paralleling said axis, torque means, means connecting the torque means with said support so that the torque means may have lateral swinging movement with respect to said support, and a universal joint connecting the torque means with said frame.

7. In an automotive vehicle, a chassis frame, an axle mounting, a spring secured to the axle mounting, cradles mounted to rock laterally on a longitudinal axis and relatively to the chassis frame, two links pivotally connecting the ends of the spring with the cradles respectively which permit the spring at both ends to have a longitudinal movement relatively to the chassis frame, torque means, a universal joint connecting the torque means with said chassis frame, and means connecting the torque means with the axle mounting so that the torque means may have lateral movement with and with respect to said mounting.

8. In an automotive vehicle, a chassis frame, two cradles each spaced apart and pivoted to the chassis frame on a longitudinal axis, an axle mounting, two springs secured between their ends to the axle mounting, links movable relatively to each other, the links connecting one set of ends of the springs to one of the cradles, means securing the other set of ends of the springs to the other cradle, a torque member, a universal joint connecting the torque member with said chassis frame, and means connecting the torque member with the axle mounting so that the torque member may have lateral movement with and with respect to said mounting.

Signed at New York city, in the county of Queens and State of New York, this eighth day of April, 1930, A. D.

MATHIAS LEUPOLD.